Oct. 21, 1924.  1,512,820
F. B. CRITCHLOW
RESILIENT WHEEL
Filed Nov. 17, 1920  3 Sheets-Sheet 1
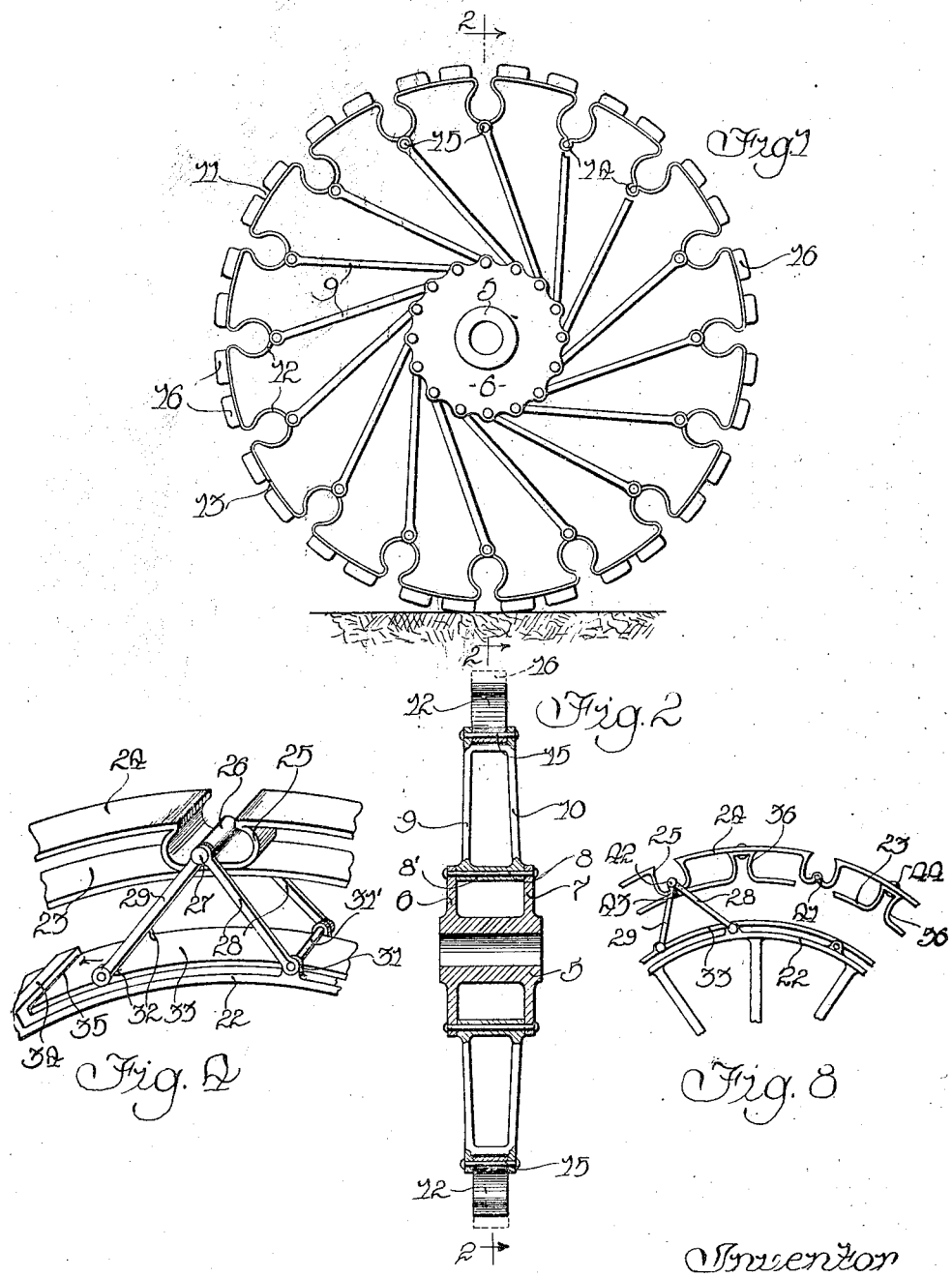
Inventor
Francis B. Critchlow
By Brown, Boettcher and
Dienner  Attorneys

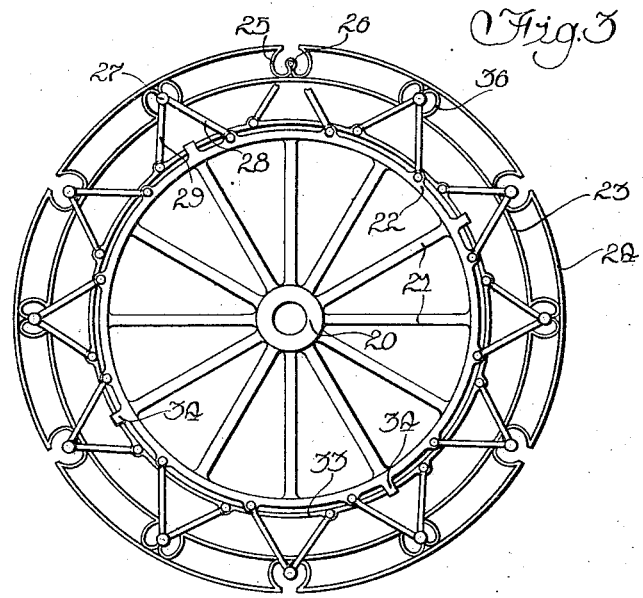
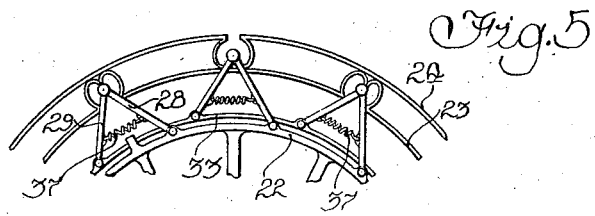
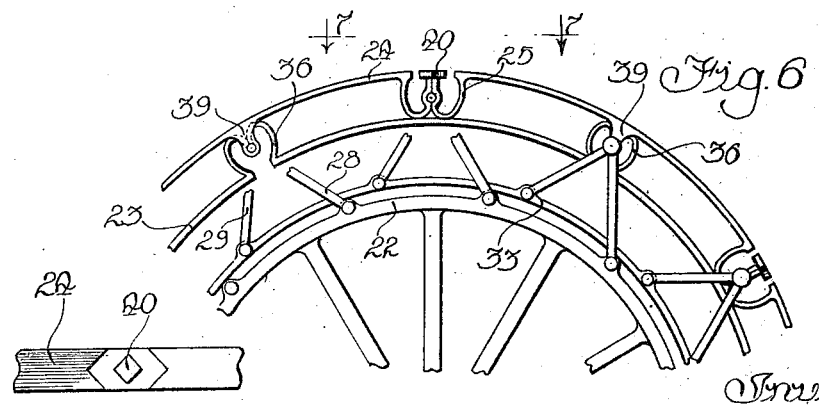

Oct. 21, 1924.
F. B. CRITCHLOW
RESILIENT WHEEL
Filed Nov. 17, 1920
1,512,820
3 Sheets-Sheet 3
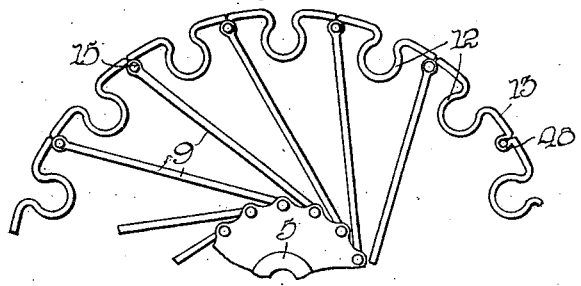
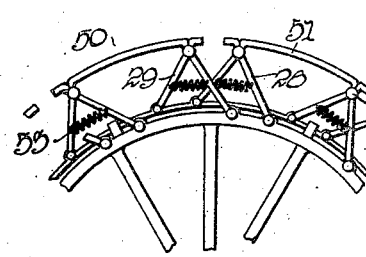
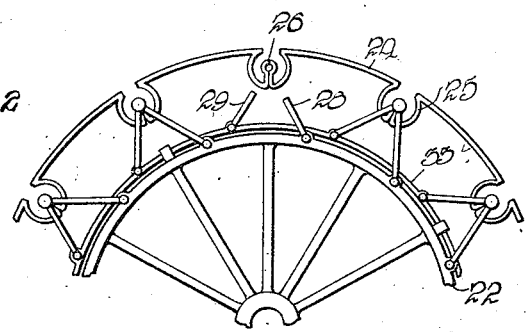
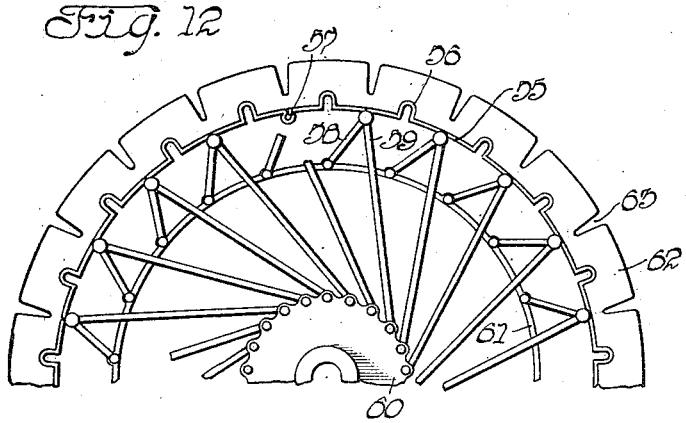
Inventor
Francis B. Critchlow
By Brown, Boettcher & Kummer
Attorneys Patented Oct. 21, 1924.

1,512,820

UNITED STATES PATENT OFFICE.

FRANCIS B. CRITCHLOW, OF SALT LAKE CITY, UTAH.

RESILIENT WHEEL.

Application filed November 17, 1920. Serial No. 424,581.

*To all whom it may concern:*

Be it known that I, FRANCIS B. CRITCHLOW, a citizen of the United States, residing at Salt Lake City, in the county of Salt Lake and State of Utah, have invented a certain new and useful Improvement in Resilient Wheels, of which the following is a full, clear, concise, and exact description, reference being had to the accompanying drawings, forming a part of this specification.

My invention relates to vehicle wheels, and particularly to resilient wheels for absorbing shocks arising from irregularities in the road and stresses, such as are caused by the weight of the vehicle, the driving torque and the like.

Heretofore, there have been provided various types of resilient wheels having the resiliency either in the spokes, or in the form of springs or other cushioning means interposed between the rim and hub. In some cases, the rim itself has been constructed of thin resilient metallic bands. The fundamental principle involved in the majority of these types, regardless of the disposition of the resilient means, is that of securing the resiliency by distorting either the shape of the rim of the wheel from a true circle or by displacing the axle from the geometrical center of the wheel. The chief disadvantage of such action is that unequal distribution of the stress upon the rim results, and at the same time, the forward motion of the vehicle is hindered. The stresses are all concentrated upon one small part of the structure. Furthermore, it has been found that when the resiliency of the wheel lies in the ability of the rim to assume a distorted configuration, it is difficult to retain a tire of any form upon the outer surface of the rim.

It is the primary object of my invention to overcome the above difficulties by providing a resilient rim wherein the absorption of sudden shocks, or other acting forces, is secured by the contraction of the rim in a variable circumference, not departing from that of the true circle.

It is the further object of this invention to provide a construction wherein the shock absorbing means is disposed in the rim of the wheel. The spokes of the wheel are preferably rigid in structure and are pivoted to the rim at points about the periphery, at which points the rim is provided with resilient loops, or other contractible means, allowing for shortening of the circumference. The spokes are pivotally mounted and act simultaneously to contract the rim when a shock is imparted at any point about the periphery.

It is a further aim of my invention to provide a novel, simple and compact resilient wheel, involving a minimum number of parts, which will be durable in use, and which may be cheaply manufactured.

Other aims of my invention not heretofore set forth will appear from the following detailed description and claims. taken with an inspection of the accompanying drawings, in which:

Figure 1 is a front elevational view of a resilient wheel embodying the basic form of my invention;

Figure 2 is a vertical sectional view taken on line 2—2 of Figure 1;

Figure 3 is a front elevational view of an alternative form of resilient wheel embodying my invention;

Figure 4 is a fragmentary isometric detail view of the means for compensating for the shrinking of the circumference as employed in Figure 3;

Figure 5 is a fragmentary elevational view of an alternative form of resilient wheel embodying my invention;

Figure 6 is a fragmentary elevational view of another alternative form of resilient wheel embodying my invention;

Figure 7 is a fragmentary detail view taken in top plan as indicated by the arrow directed numerals 7—7 of Figure 6;

Figure 8 is a fragmentary elevational view of a modified form of construction;

Figure 9 is a fragmentary elevational view of a modification of the form shown in Figure 1;

Figure 10 is a fragmentary elevational view of a modification of the form shown in Figure 3;

Figure 11 is a fragmentary elevational view of another modified form of resilient wheel embodying my invention; and Figure 12 is a similar view illustrating a form of wheel adapted to carry a tire capable of adjusting itself to circumferential variations of the wheel.

In the form of resilient wheels shown in Figures 1 and 2, which is the basic embodiment of my invention, the usual hub 5 is provided with the opposite radial flanges 6 and 7. These flanges are in spaced relation to each other upon the outer periphery of the hub, and although they are shown as integral, it is readily apparent that any other arrangement will serve the purpose. The outer or peripheral edges of the flanges 6 and 7 are provided with apertured lugs into which pass the pivot pins 8. Pivotally disposed upon the pin 8 and between the flanges 6 and 7 is a sleeve member 8' carrying a pair of integral spokes 9 and 10 which extend diagonally from the flanges 6 and 7, preferably tangential to the flanges.

The rim 11, in this instance, is made of a metallic band, circular in form, having about the circumference a plurality of inwardly extending integral loops 12, which are so formed as to give a resilient character to the rim 11. This arrangement results in the provision of integral circumferential rim sections 13, which are spaced apart from and joined to each other by the loops 12. In forming the loop 12, the metal is shaped into one side of the loop and then curved to form a smaller loop or pivotal connection 14 to which are pivoted the spokes 9 and 10 by means of the pin 15. Then the remaining side of the loop 12 is properly shaped. Upon the outer perimeter of the rim is provided a tire in the form of tread blocks 16 which are preferably spaced, so as to prevent interference thereof during contraction and expansion of the rim 11.

It will be apparent that instead of pivoting the spokes 9 and 10 to the loops 12 they could, as an alternative arrangement, be pivoted to the rim sections 13. This arrangement is illustrated in Figure 9. The rim sections 13 are provided, preferably midway between the loops 12, with the pivotal loop connections 48, which are similar to the pivotal connections 14. To these loops 48 are pivoted the spokes by the usual pins 15.

Assume that a shock is imparted to the wheel through the portion of the rim 11 adjacent the road, such shock being due to a sharp irregularity in the road bed. The hub 5 continues to move forwardly, while the rim, for an infinitely short interval, ceases in its onward movement, as a result of striking the obstructions and thereby imparts an inward compression stress to the adjacent spokes 9 and 10. This force acting through the spokes produces a slight rotation of the hub flanges 6 and 7 in advance of the motion of the wheel, with the result that all of the spokes 9 and 10 are drawn inwardly and the wheel is contracted substantially uniformly. This contraction is practically instantaneous, and by alternately contracting and expanding the circumference of the wheel, the effective radius is made to accommodate the irregularities in the road bed so that the forward motion of the hub is substantially on a straight line. It will be noted that any material stress imparted to the wheel in absorbing the shock is distributed substantially about the entire circumference of the wheel. When the wheel is on a power driving shaft the contraction of the circumference is assisted by traction of the action of the continued driving rotation of the hub flanges 6 and 7 in drawing inwardly on the spokes when the wheel is momentarily retarded upon striking an obstruction.

Referring to Figure 3 wherein is shown an improved form of resilient wheel, the hub 20, in this instance, is preferably formed integral with the spokes 21. Secured in any suitable manner to the outer ends of the spokes is the inner rigid rim 22, which is of a diameter smaller than the usual wheel rim. Disposed circumferentially about the rigid rim 22 are the inner and outer resilient band rims 23 and 24 respectively, which are arranged in spaced relation so as to jointly contract and expand. By reference to Figure 4, it will be noted that the outer rim is provided with similar resilient loops 25, each provided centrally with the upstanding pivotal bearing portion 26 for the reception of a pintle member 27 which carries at each end thereof the pair of auxiliary spokes or links 28 and 29.

The opposite ends of the links 28 are pivoted to integral lugs 31 formed upon the rigid rim 22 by means of the pintle 31'. The links 29 are at their opposite ends pivoted to similar integral lugs 32, which are in this instance formed upon the circumferential sliding band 33, which is guided and retained in proper position by means of the guides 34. The guides 34 are disposed at proper intervals about the perimeter of the rigid rim 22 and are bridged across the outer surface of the rim so as to form the slots 35, through which readily slides the band 33. As before mentioned, the provision of the resilient loops 25 results in the outer rim 24 being divided into a plurality of perimetral portions upon which are mounted the usual elastic tread blocks, serving as a tire for the wheel. The gaps formed between each of these perimetral portions allow for even perimetral contraction of the outer rim 24. As a shock or force is imparted to the rim 24, the links 29, being free to move, will cause the annular band 33 to slide in the direction of the arrow shown in Figure 4, guided in the bearings 34. The movement of the band 33 tends to evenly shorten the radii at all points about the circumference of the wheel, and consequently, the rim 24 contracts without distorting its configuration from a true circle.

The links 28 and 29 in this form of wheel alternately connect with the resilient loops 25 formed on the outer rim 24 and with resilient loops 36 formed on the inner rim 23, as shown in Figure 3. The loops 36 are similar in structure and formation to the loops 25 except that the loops 36 are inverted in position. The loops 36, by tending to expand the inner rim 23 outwardly against the outer rim 24, add to the effective resiliency of the outer rim for absorbing shocks.

In Figure 5, I have shown a still further improved form of wheel wherein the above construction is supplemented by the provision of tension springs 37 connected between the links 28 and 29, these springs assisting in the return expansion of the wheel after contraction and in the return of the links to the normal position. As before explained, because of being pivoted to the rigid rim 22, the links 28 have substantially no sliding motion with respect to the motion of the wheel and consequently these links transmit the driving or tractive effort between the rigid rim 22 and the resilient outer rim 24. On the other hand, the companion links 29 are free to move endwise with respect to the rim 22, through the sliding motion of the band 33, and thus the two sets of links 28 and 29 have a resilient knuckle or toggle action for absorbing road shocks. Upon the endwise motion of one of the links 29, the band 33 is given a circular sliding motion, with the result that the entire series of links 29 operate to contract the wheel uniformly throughout by the simultaneous contraction of both rims 23 and 24.

The forms of construction hereinbefore described, illustrate preferred embodiments of the one basic idea of my invention, each being a further development of the preceding form. In the developed form shown in Figure 6, the resilient loop 36 of the inner rim 23 is connected with the outer rim 24 by means of lugs or downwardly formed projections 39. The lugs 39 are each provided with an aperture for the pivot members which secure the links 28 and 29 to the loops 36. In this instance, the loop 25 is formed so as to provide a rectangular projection 40 between the gap provided in the perimeter of the rim 24. The projection 40 lies flush with and forms part of the outer surface of the rim 24, and is also so positioned that a diagonal thereof lies in the circumferential center of the rim. It is apparent that by this construction of linking the rims 23 and 24 together, a more uniform and stronger resiliency is given to the rims and, therefore, a smoother contraction and expansion action is obtained. The lugs 39 also serve to prevent lateral displacement of the resilient rims with respect to each other.

In the form shown in Figure 8, each resilient loop 25 and 36 is secured to the opposite rim. The loop 25 is provided at its inner end with the bearing 41 adapted to receive the pintle 42 pivoting the links 28 and 29 to the loop. The inner rim 23, in this form is provided with the apertured lug 43 which lies between the links and bearing 41. The loops 36, in this instance, are flat faced at the outer end so as to bear against the inner face of the rim 24, being secured thereto by the rivets 44. Each respective pair of links 28 and 29 function the same as previously, the slidable band 33 being operated by the links 29. When a force is imparted at any particular point to the wheel, the links 29 act to cause the slidable rim 33 to uniformly contract the outer rim 24. In doing so, each resilient loop 25 tends to act mainly upon that portion of the outer rim 24 between the adjacent rivets 44. When the loop 25 flexes, the portion of the rim 23 between the loops 36 yields so as to aid in the flexibility of the rim 24.

In Figure 10 I have shown a form of resilient wheel, instead of being provided with two resilient rims, as is shown in Figure 3, is provided with a single resilient rim. The outer rim 24 is provided with the usual inwardly projecting loops 25 having the upstanding pivotal bearing portions 26 to which are pivoted the auxiliary spokes or links 28 and 29. The opposite ends of these links connect in the usual manner with the rigid rim 22 and slidable band 33 respectively.

While there has been shown in the forms herein described a resilient wheel whose resiliency is had through means disposed in the rim, it is apparent that the salient features of this invention may be embodied in a form not having the resiliency disposed in the rim. This is clearly shown in the form illustrated in Figure 11. In this instance the outer rim 50 comprises a plurality of independent sectional members 51 arranged in spaced relation so as to permit each other to close in in order to uniformly shrink the circumference thereof. The auxiliary spokes or links 28 and 29 are provided and are secured to the rigid rim 22 and slidable band 33 in the usual manner. The opposite ends of each respective pair of auxiliary links pivot themselves to bearing portions 52 preferably formed at each end of the rim sections 51. In the contraction of the rim 50 the toggle action of the links, due to the link 28 being stationary and the link 29 being movable with respect to the motion of the wheel, causes endwise motion of the link 29, whereupon the band 33 is given a circular motion with the result that the entire series of links 29 operate to contract the wheel uniformly. In the expansion of the rim 50 the spokes 29 are returned to normal position by means of the springs 53.

In Figure 12 there is shown a still further development of my invention. In this construction provision has been made whereby an integral tire may be carried about the periphery of the rim without interference with the contraction and expansion action of the wheel. The outer rim 55 is of a resilient character, having resilient loops 56 provided thereon, and between these loops pivotal bearing portions 57, to which are pivoted the links 58 and spokes 59. The opposite ends of the spokes 59 pivotally connect with the hub flange 60, while the opposite ends of the links 58 pivotally connect with the floating band 61, which is suspended by means of these links. It will be noted that the tire 62 is substantially solid in structure, this being merely preferable, and secures its resilient compensating action by means of transverse slits 63. The resilient loops 56 of the rim 55 are countersunk in the inner periphery of the tire, and thereby, when acting to shrink the rim, enables direct control of the tire to shrink the same simultaneously. As shown, the slits 63 are disposed midway between the loops 56, which results in a more uniform disposition of the resiliency and flexibility of the wheel. The action of this form of wheel is substantially similar to that hereinbefore explained, for, when a shock or force is imparted to the wheel, the adjacent spoke 59 not having sliding movement with respect to the motion of the wheel, is substantially stationary, and thereby permits its companion-link 58 to move endwise in respect to the rim 55, and in so doing the band 61 is given a circular sliding motion with the result that the entire set of links 58 operate to contract the rim 55 and the tire 62. In contracting, the tire 62 has a tendency to shorten its inner periphery and also its outer periphery, which tendency is compensated for by the resilient loops 56 of the outer rim and the slits 63 in the tire, respectively.

It will be apparent that I have provided a resilient wheel, which, when absorbing the shocks imparted thereto, acts to decrease the radii uniformly and avoid a non-circular distortion of the rim. By not departing from a true circle, the strength of the wheel is greatly increased, as an even distribution of the stress is obtained. I believe that I am the first to devise a resilient wheel wherein the spokes are rigid in structure, and wherein the resiliency is disposed in the wheel rim and in such a manner as not to unduly weaken the rim itself.

I claim:

1. In a resilient wheel having a hub portion, a resilient rim, rigid spokes extending between said hub portion and rim, said resilient rim contracting and expanding in a variable circumference to cushion shocks imparted thereto.

2. In a resilient wheel having a hub, a rim, spokes of a fixed length connecting said hub and said rim, said spokes acting to contract and expand said rim in a variable circumference.

3. In a resilient wheel having a hub portion, a rim of variable circumference, and spokes incompressible in their lengths connecting said hub portion and said rim whereby the rim is permitted to contract and expand substantially uniformly about its circumference.

4. In a resilient wheel having a hub portion, a rim, resilient means disposed at a plurality of points about said rim, rigid spokes connecting with said hub portion and said rim through said resilient means, said resilient means causing said rim to uniformly contract and expand to compensate for varying forces acting on said rim.

5. In combination, a hub member, having spokes and a rigid rim, guide members on said rim, a slidable band carried by said guide members, resilient rims, links connecting said resilient rims and slidable band, said slidable band acting to uniformly contract and expand said resilient rims.

6. In combination, a hub member having spokes and a rigid rim, resilient rims adapted to contract and expand for absorbing shocks or the like, links connecting said rigid rim with said resilient rims, means carried by and adapted to have slidable movement relative to said rigid rim and links connecting said resilient rims with said means to cause uniformal contraction and expansion of the resilient rims.

7. In combination, a hub member having spokes and a rigid rim, resilient rims adapted to contract and expand for absorbing shocks or the like, a band member carried by said rigid rim and adapted to freely move relative thereto, and a pivotal connection between said resilient rims and said rigid rim and between said resilient rims and band member, said pivotal connections causing uniformal contraction and expansion of the resilient rims in a variable circumference.

8. In combination, a resilient wheel having a hub member with spokes and a relatively rigid rim, resilient rims having contraction and expansion action, a band carried by said rigid rim adapted to move relative to said rigid rim and resilient rims, and rigid links connecting said resilient rims, rigid rim and movable band to permit uniformal contraction and expansion of the wheel.

9. In combination, a resilient wheel having a hub member with spokes and a relatively rigid rim, resilient rims adapted to expand and contract, a circumferential band carried by said rigid rim having movement relative to the rigid rim, pivot bearings carried by said resilient rims, pivot bearings carried by said rigid rim and circumferential band, a plurality of link members pivoted to said resilient rims and rigid rim bearings, a plurality of link members pivoted to said resilient rims and circumferential band bearings, said second link members causing said circumferential band to uniformly contract and expand the resilient rims in a variable circumference.

10. In combination, a resilient wheel having a hub member, spokes and a relatively rigid rim, an outer and an inner rim adapted to be carried in circumferential spaced relation to each other, resilient means provided on and disposed between said outer and inner rims, each of said resilient means adapted to have a flexible connection with said rigid rim and a compensating circumferential member, said circumferential member adapted to distribute absorbed shocks or forces uniformly about the circumference of the wheel.

11. In combination, a resilient wheel having a hub portion, spokes and a relatively rigid rim, an outer and an inner rim adapted to be carried in circumferential spaced relation to each other, integral resilient loops on said outer and said inner rim adapted to lie between said rims to permit flexibility of the same, a circumferential band member carried by said rigid rim, and pivotal connections between said integral resilient loops and said rigid rim and between said loops and said circumferential band member whereby uniform absorption of shocks or the like throughout the wheel is obtained.

12. In combination, a resilient wheel having a hub portion, spokes and a relatively rigid rim, an outer and inner resilient rim member disposed in circumferential spaced relation to each other adapted to simultaneously contract and expand, a circumferential band member carried by said rigid rim adapted to freely move relative to the rigid rim, oppositely disposed link members securing said outer and inner resilient rims to said rigid rim and circumferential band member, said link members acting to uniformly contract and expand the resilient rim members and to prevent lateral displacement of the rim members.

13. In combination, a resilient wheel having a hub portion, spokes and a rigid rim, an outer and an inner resilient rim member carried in circumferential spaced relation to each other adapted to simultaneously contract and expand, links connecting said resilient rims with the rigid rim, a circumferential band member movably carried on said rigid rim, links connecting said resilient rims with said circumferential band member for causing the same to revolve to compensate for contraction of the resilient rims, and spring means causing said latter links to return to normal position to expand the resilient rims.

14. In a wheel, a contractible rim, a hub and members connecting the hub and rim, said members all varying substantially equally in angular position with respect to the rim and hub as the rim is contracted.

15. In a wheel, a rim, a hub, members between said hub and said rim, said members being angularly disposed relative to each other, and shock absorbing means cooperating with said members whereby in the operation of absorbing shock the relative angularity between said members is changed around the entire circumference of the wheel.

16. In a wheel, the combination of a hub portion, a metallic rim adapted to expand and contract in a variable circumference, and a plurality of longitudinally incompressible members supporting said rim.

17. In a wheel, the combination of a hub portion, a rim adapted to expand and contract in a variable circumference to cushion shock imparted thereto, and a plurality of pivotally connected members for supporting said rim, said members being disposed for pivotal motion in the vertical plane of said wheel.

18. In a wheel, a hub member having spokes and a rigid rim, a slidable band member carried by said rigid rim, an outer rim consisting of sections, link members connected in pairs connecting said outer rim and said rigid rim and said outer rim and said slidable band, said slidable band uniformly contracting said outer rim, and spring means between the respective pairs of link members for causing the same to return the link members and outer rim to normal position.

19. In a wheel, a rim consisting of sections joined by spring means for permitting contraction of the circumference of the rim, a circumferential band member having slidable motion in respect to the motion of the wheel, and pivotal connections between said rim and said circumferential band member whereby a force imparted to the wheel causes the circumferential band member to act upon the entire circumference of the rim.

20. In a wheel, a resilient rim consisting of sections for permitting contraction of the circumference thereof, a stationary member carried by the hub of the wheel, a movable band member disposed between said resilient rim and said stationary member, and a series of links pivotally connecting said resilient rim, stationary member and band member.

In witness whereof, I hereunto subscribe my name this 10th day of November, 1920.

FRANCIS B. CRITCHLOW.